(No Model.) 3 Sheets—Sheet 1.
J. S. GOLDSMITH.
STREET SWEEPING MACHINE.
No. 269,847. Patented Jan. 2, 1883.
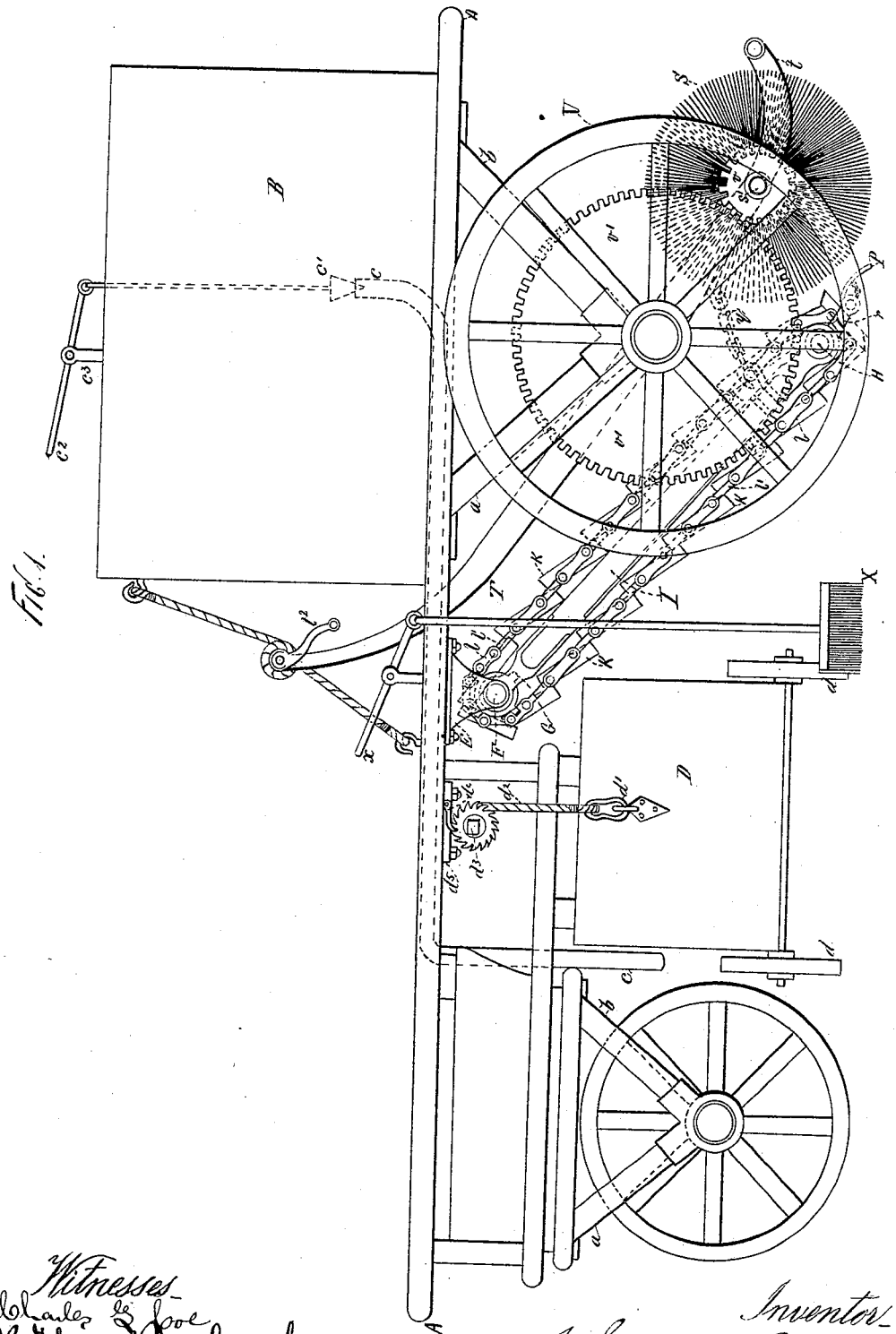
Witnesses
Charles L. Poe
R. Van Boskerck
Inventor
J. Sidney Goldsmith

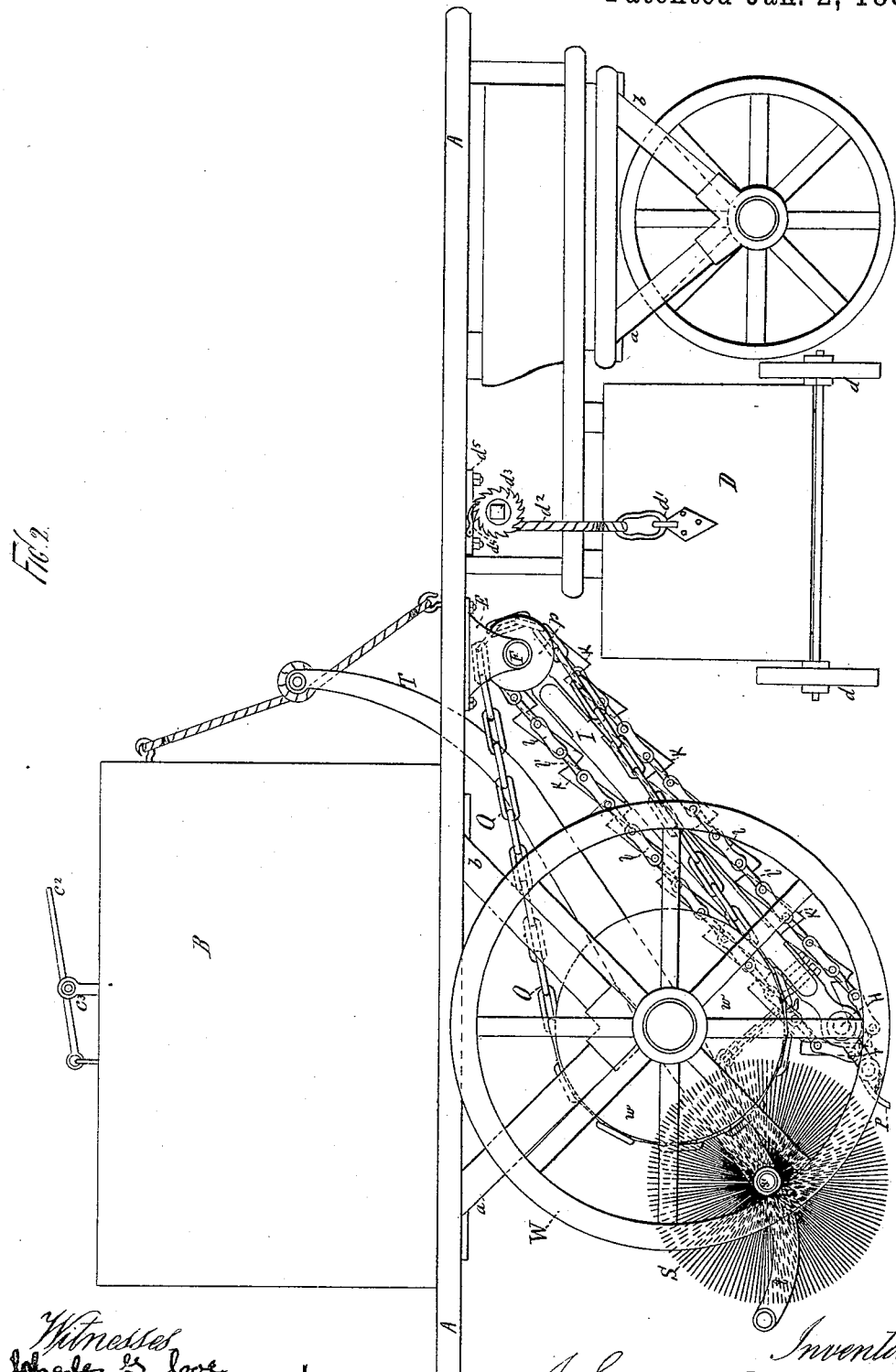

(No Model.)  3 Sheets—Sheet 3.
J. S. GOLDSMITH.
STREET SWEEPING MACHINE.
No. 269,847. Patented Jan. 2, 1883.
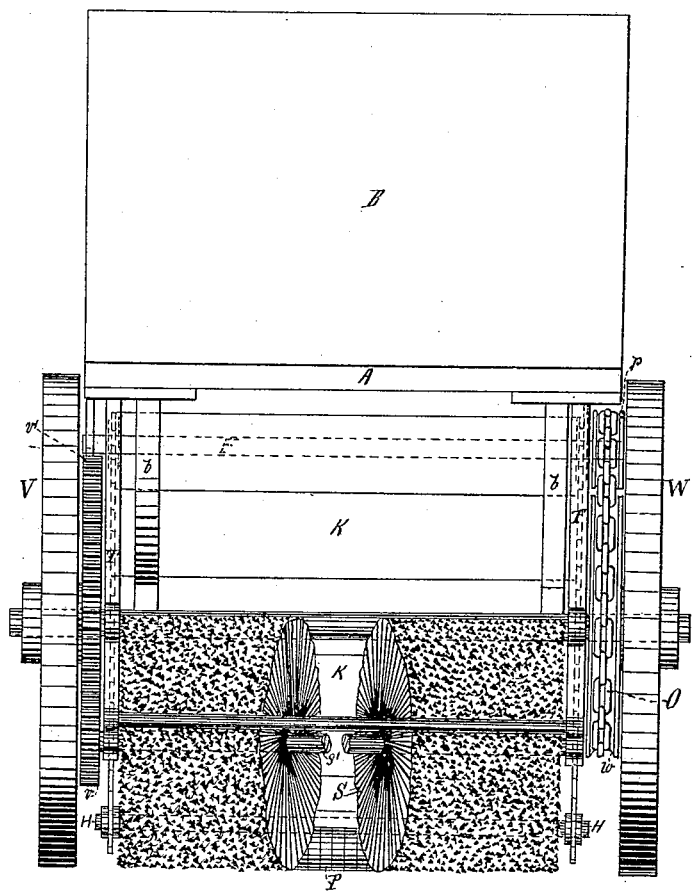
Witnesses:
Charles E. Coe
R. J. Van Buskirk
Inventor:
J. Sidney Goldsmith

UNITED STATES PATENT OFFICE.

JOHN S. GOLDSMITH, OF NEW YORK, N. Y.

STREET-SWEEPING MACHINE.

SPECIFICATION forming part of Letters Patent No. 269,847, dated January 2, 1883.

Application filed March 2, 1882. (No model.)

*To all whom it may concern:*

Be it known that I, JOHN SIDNEY GOLDSMITH, a citizen of the United States, residing at the city, county, and State of New York, have invented a new and useful Improved Street-Sweeping Machine, of which the following, taken in connection with the accompanying drawings, is a full, clear, and accurate description.

The object of my invention is to form an improved street-cleaning apparatus which shall combine in the same machine a street-sweeper, sprinkler, dirt-collector, and removable receptacles, which receptacles can be detached from the rest of the apparatus and emptied at any desired place.

In the drawings, Figure 1 represents a side view of one side of my improvement. Fig. 2 represents a side view of the other side of the same. Fig. 3 shows a back view, with a portion of the sweeper proper removed.

A is a platform supported on wheels, of which I use preferably three, by the supports $a\ b$, or in any other convenient way, by means of which the axles of said wheels can be supported at a proper distance below the bottom of the platform A. Secured above this platform is a cask or tank, B, to be filled with water, and furnished with a water-pipe, $c$, provided with a valve, $c'$, which is operated by the lever $c^2$, attached to the bar $c^3$ on the top of the tank B. The pipe $c$ passes along or through the platform A to near the back of the front wheel or wheels of the machine, where it turns downward and terminates in a sprinkler. (Not shown in the drawings.)

Attached to the bottom of the platform A, immediately behind the front wheel or wheels and sprinkler, is the removable box or dirt-receptacle D, mounted on small wheels $d$. Said box D has on two of its opposite sides hooks $d'$, by means of which it is secured to the platform A by the ropes $d^2$, which are wound around the windlass $d^3$, operated by a crank and ratchet and pawl, $d^4$, or other suitable means, said windlass being held in position by the bearings $d^5$.

Immediately over the back of the box or receptacle D are attached the hangers E, in which hangers E is the shaft F. To this shaft F is attached loosely the frame G, provided at its lower end with sockets, in which revolves the shaft H. Around the shafts F and H is placed the movable platform I, composed of the slats K, fastened at their lower ends upon chains or belts $l$ and $l'$, the upper part of said slats K overlapping each other. Motion is communicated to the shaft F by means of the chain $o$, passing over the pulley $p$, affixed to one end of said shaft F, and a pulley, $w$, attached to one of the hind wheels, W, and thus causing the movable platform I to revolve.

At the lower end of the frame G is the bar $r$, on which is placed the apron or slide P, composed of narrow pieces of wood or iron placed side by side upon the bar or rod $r$, and adapted to adjust itself to the inequalities of the pavement or road, said apron being so placed that its upper edge is almost in contact with the movable platform.

The sweeper is composed of the rotary broom $s$, mounted in the lower part of the frame T, said frame being composed of two side pieces, $t$, secured together at each end by bars, and mounted loosely upon the hind axle of the truck or platform A. The shaft $s'$ of the broom $s$ is provided at one end with the cog-wheel $v$, which engages with the cog-wheel $v'$, which in turn is affixed to the hind wheel, V. Around the upper bar of the sweeper-frame T is passed a rope, secured at either end to hooks or staples in the platform A and tank B, respectively, and by means of the crank or handle $t^2$ the sweeper $s$ is raised or lowered, as desired.

At one side of the platform A, and between the box or receptacle D and the hind wheels of said platform A, may be attached a supplementary sweeper or broom for the purpose of cleaning the gutters or edge of the road and sweeping the dirt therein into the path of the main sweeper or brooms $s$. This supplementary broom or sweeper is composed of a broom, X, set at an angle to the sides of the apparatus, and can be raised as desired by the lever $x$. By means of the chain $y$, attached at one end to the sweeper-frame T and at the other to the frame G, the frame and movable platform I is raised and lowered.

The mode of operation of my improved sweeper is as follows: The box or receptacle D being adjusted in its proper place by the ropes $d^2$ and the windlass $d^3$, the water-tank B is filled with water. The sweeper $s$ and movable platform I, with its supporting-frame G, is lowered so that the apron at its lower end touches the ground, and the supplementary broom X is also lowered into position. The machine is now ready to start. The lever $c^2$ being pulled, the street is sprinkled. The dirt in the gutter is swept by the broom X into the path of the main broom s, which, being revolved by the action of the cog-wheels v and $v'$, sweeps the dirt onto the apron P and the lower part of the movable platform I, where it is caught by the ridges formed by the overlapping slats K and carried up by the movement of said platform I until the said platform reaches its highest point, where it falls by gravitation into the box D. When the box D is filled it is lowered by the windlass $d^3$ to the ground and taken away and another empty box or receptacle put into its place in the machine.

The box or wagon-receptacle D can be moved to any place where it is desired to finally deposit the dirt without interrupting the work of the sweeping-machine.

Having thus described my invention, what I claim, and desire to secure by Letters Patent, is—

1. The combination, with the frame A, mounted on wheels, as described, of the revolving brush s, frame T, pulley $t^2$, engaging with a rope stretched between two fixed points of the machine proper, water-tank B, with the sprinkling-pipe c, platform I, frame G, shafts F H, apron P, chain o, pulleys p w, gear-wheels v $v'$, and removable receptacle D, all constructed and operating substantially as and for the purpose specified.

2. The combination, with the frame A, mounted on wheels, as described, of the revolving brush s, frame T, and the pulley $t^2$, engaging with a rope stretched between two fixed points of the machine proper, substantially as described.

In testimony whereof I have hereunto set my hand this 15th day of February, 1882.

JOHN SIDNEY GOLDSMITH.

In presence of—
JOHN BUCKLER,
R. I. VAN BOSKERCK.